United States Patent [19]
Forsyth

[11] 3,789,352
[45] Jan. 29, 1974

[54] METHOD AND APPARATUS FOR TESTING DEPTH FINDERS

[75] Inventor: Eric B. Forsyth, Brookhaven, N.Y.

[73] Assignee: Ensign Electronics, Inc., Brookhaven, N.Y.

[22] Filed: May 25, 1972

[21] Appl. No.: 256,789

[52] U.S. Cl. .................................. 340/5 C, 35/10.4
[51] Int. Cl. ............................................ H04b 11/00
[58] Field of Search ....... 340/3 R, 3 S, 5 C; 35/10.4

[56] References Cited
UNITED STATES PATENTS 2,522,541  9/1950  Saxton et al. ........................ 35/10.4
3,153,770  10/1964  Feistman et al. ..................... 340/5 C Primary Examiner—Richard A. Farley
Attorney, Agent, or Firm—Wolfgang G. Fasse

[57] ABSTRACT

Depth finders are tested and calibrated on the bench without the respective transducer, by generating a delayed pulse responsive to the depth finder's transmitted pulse, the delayed pulse being applied to the depth finder to simulate an echo pulse. Preferably, the echo pulse is in the form of spikes to shock excite the depth finder. A circuit is also provided to indicate the amplitude and width of the transmitted pulse of the depth finder.

8 Claims, 4 Drawing Figures

METHOD AND APPARATUS FOR TESTING DEPTH FINDERS

BACKGROUND OF THE INVENTION

This invention relates to a method and apparatus for testing ranging devices of the type used to determine underwater distance. The invention is particularly directed to the testing of such devices in an out-of-water environment, for example, on the bench.

Conventional depth finders generally employ piezoelectric transducers which employ materials such as barium titanate, to convert an electrical signal to an ultrasonic sound signal in the water. By controlling the angle and directivity of the transducer, the sound wave is propagated to the bottom of a body of water, whereupon the sound wave is reflected and returns to strike the transducer. Thus an electrical signal is produced at a time after the original transmitted pulse, whereby the time depends upon the depth of the water and the velocity of sound in the water. The velocity is assumed to be constant in the simpler types of depth finders. Roughly the time delay is about 2 milliseconds for every 5 feet of seawater depth.

The frequency of the ultrasonic signal varies from one manufacturer to another, but is usually in the range of 100 kHz to 250 kHz. The signal is amplitude modulated so that the transmitted pulse generally has a pulse width between 0.1 and 1.0 milliseconds. The period between the pulses varies greatly depending upon the type of the depth finder. The time difference between the transmitted pulse and the return echo must be converted into a suitable indication. This conversion may be accomplished in a number of different manners.

For example, in one form of indicator, a neon lamp is mounted on a rotating arm which is driven at a constant speed by an electric motor. The output signal from the device is generated when the lamp is in a position corresponding to a depth of "0" feet. The amplified return signal causes the neon bulb to glow briefly. Since the lamp has removed to a new position during the time taken for passage of the signal to the sea bed and back, the position at which the lamp glows can be made to appear opposite to the correct calibration mark at the edge of the rotating arm. Due to the high rotational speed of the arm, the brief glow of the lamp appears as a continuous light at the position corresponding to the depth.

In another form of indicator, the time delay between the transmitted and received signals is converted to a proportional current, which is read on a meter. Thus, no delay produces no current and a depth corresponding to the full scale deflection of the meter has a time period of transit which produces exactly the right current to provide a full deflection.

In still another form of a depth finder indicator, a circuit is used to convert the time delay to a voltage proportional to the delay time. This voltage is then converted to digital form, and read on a digital read out indicator.

A recording indicator has also become known wherein the time delay between the transmitted and reflected pulses is converted to a corresponding deflection of a stylus. This deflection is recorded on moving paper, and thus provides a profile of the sea bed as the vessel moves over it.

In the past testing equipment has been provided to calibrate and test the operation of depth finders of the above described types. Such prior testing equipment, however, frequently has the disadvantage that it may be used only to test a specific type of depth finder, for example, depth finders that operate within a predetermined narrow frequency range. The capabilities of other testers are limited by the fact that they must be employed with the depth finders being tested or calibrated in the sea water.

It is frequently necessary, however, to test depth finders without having available the transducer with which the depth finder usually operates because the transducer usually becomes a permanent fixture on the boat after installation and if the depth finder is removed for servicing or calibration the transducer must be left behind.

OBJECTS OF THE INVENTION

In view of the above, it is the aim of the invention to achieve the following objects singly or in combination:
to provide a method and apparatus for testing underwater echo ranging equipment that overcomes the above disadvantages of the prior art;
to provide a method and apparatus for testing and calibrating depth finding equipment without the need for connecting the transducer to the depth finder;
to provide a method and apparatus for testing a depth finder out of the sea water environment;
to provide a method and apparatus for testing depth finders substantially independently of the inherent frequency and pulse characteristics of the equipment being tested;
to simulate an echo signal which will produce the same display as a real echo;
to provide means for measuring the output pulse and to indicate whether its duration and amplitude meet certain conditions; and
to provide means for producing an echo signal which will not be rejected by noise suppression circuits within the depth finder.

SUMMARY OF THE INVENTION

Briefly stated, in accordance with the invention, means are provided for producing an electrical signal at the terminals of the depth finder normally connected to the transducer, so that it simulates the effect of the sonic echo which impinges on the transducer in normal service. This signal is injected by the present testing device into the terminals which are external to the depth finder circuitry, and thus a full test can be carried out without the necessity of an internal connection.

By including means for carefully controlling the frequency spectrum of the simulating signal, the testing device according to the invention is made to operate any depth finder despite the fact that depth finders are individually tuned to the resonant frequency of the transducer supplied with the depth finder. This is an advantage of the invention because the resonant frequency of transducers used in depth finder service varies widely.

By including means for controlling the frequency spectrum of the simulated echo the testing device according to the invention also can be made to operate depth finders which have internal circuits to prevent electrical noise, such as ignition interference from inadvertently operating the depth indicating circuitry.

The apparatus of the invention includes means for delaying the echo signal so that by varying the amount of time delay the echo can be arranged to operate the depth finder to show indication of depth at some selected depth. By suitably calibrating the echo delay time to correspond to the round trip for an ultrasonic echo in water, the accuracy of the depth finder can be ascertained. This calibration can be accurate for sea and fresh water.

In addition, the invention includes means for controlling the amplitude of the simulated echo signal so that a level can be provided which truly simulates the signal normally delivered by the transducer at the depth corresponding to the delay time which is set.

The invention also includes means for evaluating the output electrical signal from the depth finder. This signal is normally converted by the transducer into an ultrasonic pulse. If this signal is defective, erratic operation will occur. The apparatus according to the invention includes means for examining the amplitude and duration of this pulse, and provides an indication if both properties exceed certain threshold valves. ,7

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Figure 1:
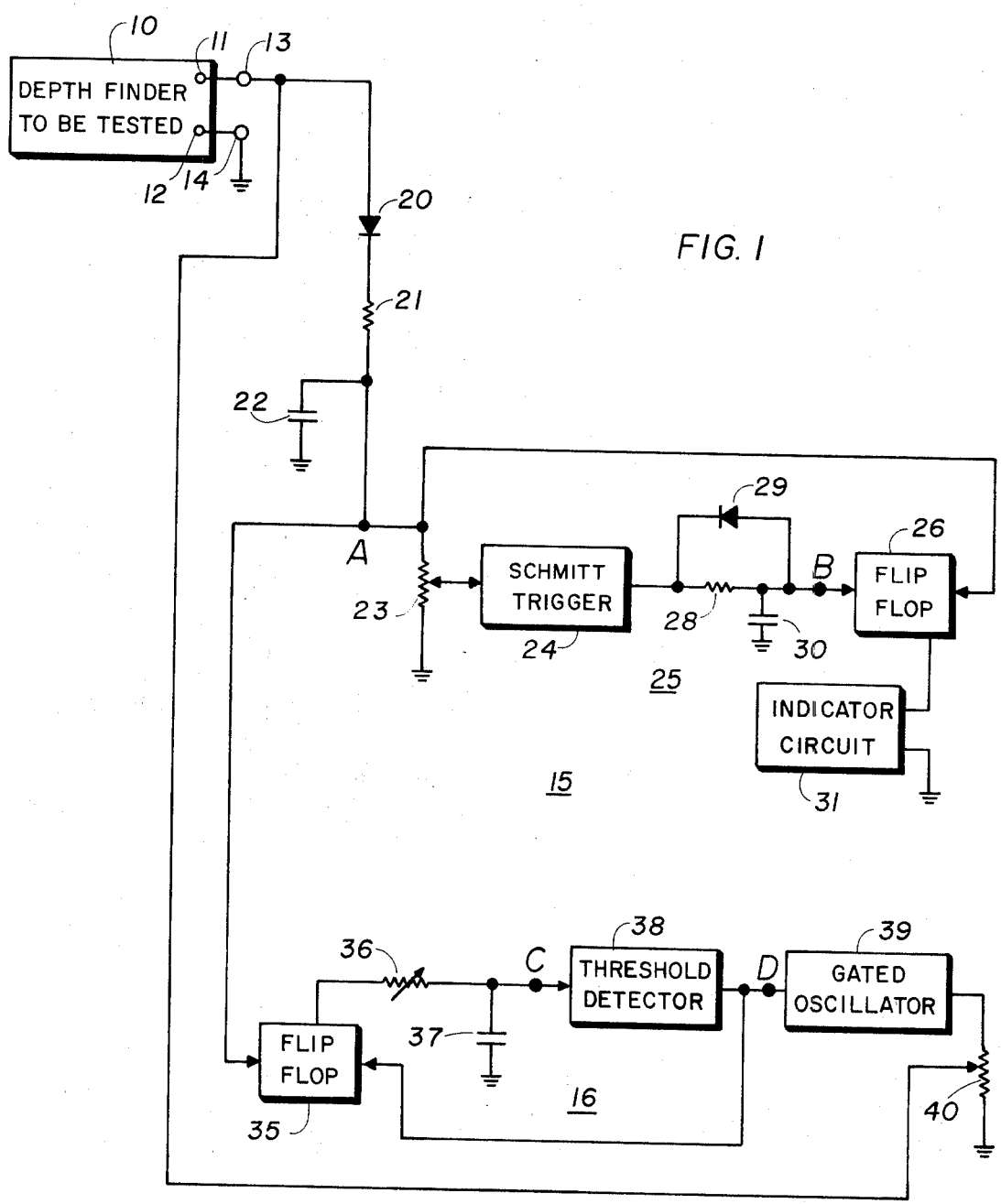
FIG. 1 is a circuit diagram, partly in block form, illustrating a depth finder tester and calibrator according to the invention.

FIG. 1 illustrates a circuit of a depth finder tester according to the invention. The transducer (not shown) of the depth finder 10 to be tested is disconnected from the terminals 11 and 12 of the depth finder. These terminals are then connected to the terminals 13 and 14 respectively of the testing apparatus of the invention.

The testing apparatus comprises a circuit 15 for determining whether the pulse output of the depth finder is satisfactory, and a circuit 16 for responding to the transmitted output pulse of the depth finder and providing a simulated delayed pulse or echo for application to the depth finder.

Figure 2:
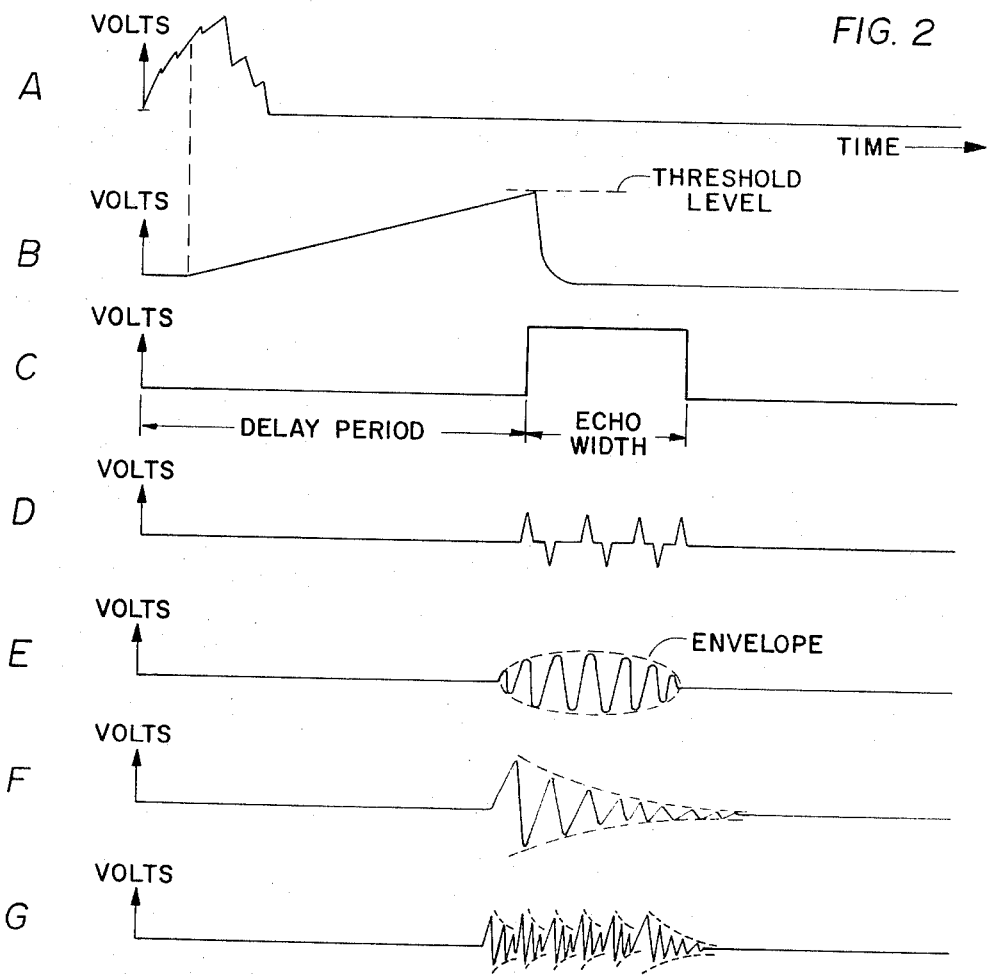
FIGS. 2A to 2G illustrate various waveforms for explaining the operation of the circuit of FIG. 1.

The transmitted output pulse of the depth finder is applied to a detector, which may comprise a diode 20 and the envelope of the detected pulse is filtered by a series resistor 21 and a shunt capacitor 22. A typical waveform of the filtered pulse at the output point A of the filter is shown in FIG. 2A.

The pulse at point A in the amplitude and duration portion 15 of the circuit is applied to a potentiometer 23. The arm of the potentiometer 23 is connected to the input terminal of a Schmitt trigger circuit 24. This circuit may be of conventional design. The output of the Schmitt trigger circuit is applied, by way of a ramp modifying circuit 25 to one input of a flip-flop circuit 26. The ramp circuit may comprise a series resistor 28, a diode 29 in parallel to the resistor 28, and shunt capacitor 30. A second input of the flip-flop circuit 26 is connected to the point A. An output of the flip-flop circuit 26 is connected to a suitable indicator, such as a lamp circuit 31. The lamp circuit 31 and the flip-flop circuit 26 may be conventional. The lamp circuit is turned off in response to the pulse applied to the flip-flop circuit directly from the point A and is turned on in response to the application of a pulse to the input from the ramp circuit 25.

The signal at point A is applied to one input terminal of a flip-flop circuit 35 in the circuit 16. The output of the circuit 35 is applied, by way of a charging circuit including a series variable resistor 36 and a shunt capacitor 37 to a threshold detector 8. The output of the threshold detector 38 is applied to the input gated circuit of a gated oscillator 39 and also to a second input of the flip-flop circuit 35. The output of the gated oscillator 39 is applied through a potentiometer 40 back to the terminal 13 and thus to the depth finder.

In the portion 16 of the circuit, the flip-flop 35, which may be the same as the flip-flop circuit 26, is turned on when a pulse at point A occurs to apply a voltage to the charging circuit. The flip-flop 35 is turned off by a pulse from the output of the threshold circuit 38 to remove the voltage from the charging circuit. The voltage across the capacitor 37 at point C, in typical form, is illustrated in FIG. 2B. The voltage at point D and the output of the threshold detector is shown in FIG. 2C. The threshold detector 38 may be conventional, for example, such as a Schmitt trigger and the gated oscillator 39 may also be conventional.

In operation of the amplitude and duration detector portion 15 of the circuit, the waveform at point A is applied through potentiometer 23 to the Schmitt trigger 24. When this signal exceeds a threshold level of the Schmitt trigger, the output voltage of the Schmitt trigger abruptly switches from 'high' to 'low' This change is modified by the network 25 so that the abrubt change becomes a ramp, thus slowing down or delaying the effect of the waveform A. If this waveform is too narrow, the change at the output of the network (point B) is not enough to trigger flip-flop 26. If the waveform is wide enough the flip-flop is triggered 'on' and a lamp circuit 31 is operated. The flip-flop is turned off by the waveform A. However, if the potentiometer 23 is advanced to the threshold level, the flip-flop is turned on and operates the lamp circuit 31 showing that the pulse is acceptable. The potentiometer 23 may be calibrated to show the amplitude of the waveform A and thus indicate the quality of the output pulse from the depth finder.

In the operation of the delay circuit 16, the waveform A is also used to trigger the delay circuit. In FIG. 1 a flip-flop 35 is turned on by this signal so that the capacitor 37 starts to charge through the variable resistor 36. At some time later, determined by setting of the resistor 36, the capacitor 37 becomes charged to the threshold voltage of circuit 38. The output of the threshold circuit then causes flip-flop 35 to be turned off and thus capacitor 37 to be discharged. The pulse from threshold detector 15 is of sufficient width to simulate an echo about four-tenths milliseconds wide. The time for a pulse at point D to appear after the waveform at point A depends on the value of the resistor 36, which may be calibrated in feet, fathoms, etc. A waveform at A must be present before the delay begins which produces the delayed pulse. This simulates the travel of a signal in actual operation to the sea floor and back to the transducer.

The pulse at point D triggers the gated oscillator 39 which produces either a series of brief spikes or delta functions during the time the output pulse of the threshold detector is present, as shown in FIG. 2D, or a sine wave as shown in FIG. 2E. This waveform is applied through a gain control potentiometer 40 to the transducer terminal 13. The gain control potentiometer 40 is employed to vary the intensity of the oscillation to simulate the intensities of echo pulses from different depths and also to adjust amplitude of echo to compensate for differing sensitivity of various depth finders. If a sine wave is generated a tuning device such as a variable inductor or capacitor must be provided so that the frequency corresponds to the tuned frequency of the depth finder.

The spectrum of the waveform shown in FIG. 2D is preferably employed so that the tester of the invention will operate with any depth finder even though it is equipped with noise suppression circuits. A depth finder contains a tuned amplifier which is shock excited by a delta function to oscillate at its resonant frequency, however, the waveform dies down rapidly at a rate depending on the quality factor Q of the tuned amplifier. This is shown in waveform FIG. 2F. This signal would not normally be long enough to simulate a true echo and would be rejected by the noise suppression circuit. However, the effect of a series of delta functions produces a signal closely resembling an echo in the amplifier of the depth finder as shown in FIG. 2G. When the output of the gated oscillator is in the form of a series of spikes as shown in FIG. 2D, the tuned circuits of the depth finder may be shock excited to produce the signal of FIG. 2G so that the tester of the invention will test the depth finder regardless of its operating frequency.

Figure 3:
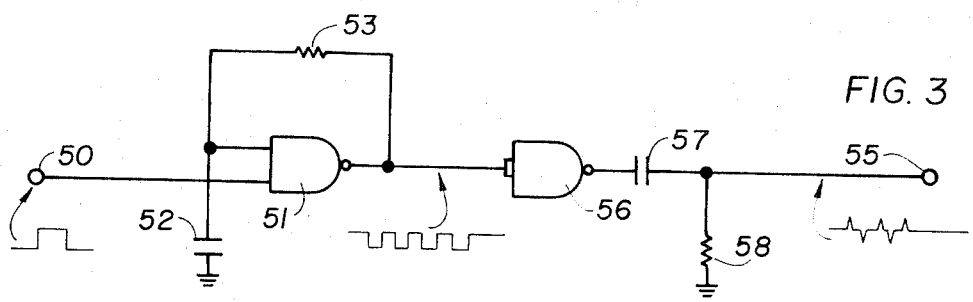
FIG. 3 is a circuit diagram of a gated oscillator for producing a spike train pulse output for use in the circuit of FIG. 1.

An example of a gated oscillator for producing a train of gated spike pulses is illustrated in FIG. 3. In this circuit the gating pulse is applied to an input terminal 50 connected to one input of NAND circuit 51. The other input of the NAND circuit is connected to ground through the capacitor 52, and to the output thereof by way of resistor 53. The output of the circuit 51 is thus a series of pulses during the occurrence of the gating pulse as illustrated in the figure. This series of pulses is applied to the output terminal 55 of the circuit through a buffer 56 and a differentiating circuit comprised of series capacitor 57 and shunt resistor 58, to produce the output of spike pulses during the occurrence of the gating pulse.

Figure 4:
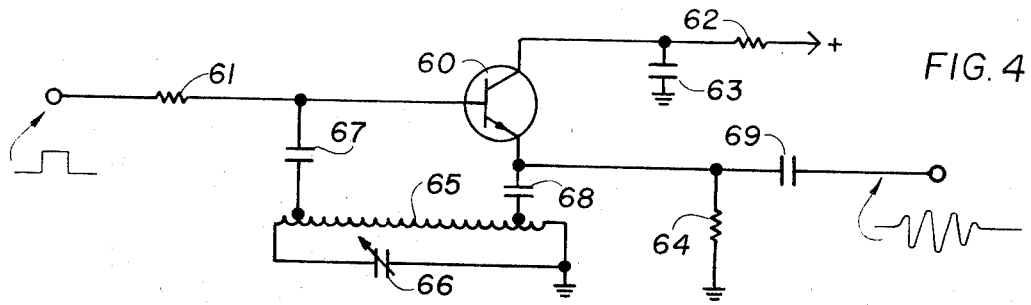
FIG. 4 is a circuit diagram of a gated oscillator for producing a sine wave output for use in the circuit of FIG. 1.

FIG. 4 illustrates a circuit that may be used as the gated oscillator of FIG. 1 if it is desired to produce a sinusoidal output, that is, sine waves occurring during the time of the gating pulse. The gating pulse is applied to the base of transistor 60 by way of resistor 61. The collector of the transistor is connected to the supply source by way of resistor 62, and to ground through the capacitor 63 while the emitter is connected to ground by way of resistor 64. A parallel resonant circuit including inductor 65 and capacitor 66 has one end connected to ground. The capacitor 66 may be variable continuously or stepwise to vary the oscillation frequency. One tap of the inductor is connected to the base of the transistor by way of capacitor 67, and a feedback tap on the inductor is connected to the emitter by way of capacitor 68. The output of the circuit is taken from the emitter by way of capacitor 69.

While a capacitor charging delay circuit has been shown and described it is to be understood, that the delay function can be achieved in many ways. For example, a digital method may be employed to count a preselected number of pulses and then to operate the gated oscillator 39 at a selected time. There are many ways of building the functional blocks described above, all of which are familiar to those skilled in the art of electronic engineering.

Incidentally, the return signal at the tap of the potentiometer 40 is low enough in amplitude to avoid the re-triggering of the Schmitt trigger 24. Even if the potentiometer 40 should be set to full output, the return signal would be only about 300 millivolt maximum and it is thus blocked by diode 20 which may be a silicon diode with a forward threshold of about 500 millivolts.

Although the invention has been described with reference to specific example embodiments, it is to be understood, that it is intended to cover all modifications and equivalents within the scope of the appended claims.

What is claimed is:

1. A method of testing a depth finder independently of the operating frequency thereof, wherein said depth finder is of the type having a transducer connected to terminals thereof, said method comprising operating said depth finder with said transducer disconnected from said terminals, generating a delayed series of spike pulses responsive to each output pulse from said depth finder, and applying said delayed series of pulses tO said terminals to shock excite said depth finder.

2. The method of claim 1, wherein the pulse repetition rate of said spike pulses is lower than the normal operating frequency of said depth finder.

3. An apparatus for testing depth finders independently of the operating frequency thereof, said depth finders being of the type having terminals adapted to be connected to a transducer, said apparatus comprising circuit means to be connected to the terminals of said depth finder with said transducer disconnected, said circuit means comprising means responsive to each output pulse from said depth finder for generating a series of delayed spike pulses, and means for applying said series of delayed pulses to said terminals.

4. An apparatus for testing depth finders independently of the operating frequency thereof, said depth finders being of the type having terminals to which a transducer is normally connected, said apparatus being adapted to test said depth finder with its transducer disconnected, comprising circuit means connectable to said terminals, said circuit means comprising means for rectifying output pulses from said depth finder to produce an envelope waveform signal, means responsive to said waveform signal for producing a delayed gating pulse, gated oscillator means comprising means for producing a pulse train of spike pulses during the occurrence of said gating pulse, means applying said gating pulse to said gated oscillator to produce an output oscillation signal, and means for applying said output oscillation signal to said terminals of the depth finder, whereby tuned circuits of said depth finder are shock excited.

5. An apparatus for testing depth finders of the type having terminals to which a transducer is normally connected, said apparatus being adapted to test said depth finder with its transducer disconnected, comprising circuit means connectable to said terminals, said circuit means comprising means for rectifying output pulses from said depth finder to produce an envelope waveform signal, bistable circuit means connected to be set to one state by said envelope waveform signal, threshold circuit means, charging circuit means connected to apply the output of said bistable circuit means to said threshold circuit means, means connecting the output of said threshold circuit means to set said bistable circuit means to its other stable state, whereby said threshold circuit means provides a gating pulse, gated oscillator means, means for applying said gating pulse to said gated oscillator to produce an output oscillation signal, and means for applying said output oscillation signal to said terminals of the depth finder.

6. The apparatus of claim 5, wherein said gated oscillator means comprises means for producing a sinosoidal waveform voltage having an operating frequency corresponding to that of said depth finder during the occurrence of said gating pulse.

7. The apparatus of claim 5, further comprising means responsive to said envelope waveform signal for producing an output indication of the amplitude and width of said envelope waveform signal.

8. The apparatus of claim 7, wherein said means for producing an output indication comprises a trigger circuit, means applying said envelope waveform signal to said trigger circuit, a ramp generator connected to the output of said trigger circuit, flip-flop circuit means connected to said ramp generator for setting said flip-flop to one stable state, means applying said envelope waveform signal to said flip-flop circuit for setting it to its other stable state, and indicator means connected to the output of said flip-flop circuit.

* * * * *